Oct. 12, 1926.

H. P. CHRISTENSEN 1,602,881

INSERT ATTACHMENT FOR BREAD WRAPPING MACHINES

Filed April 12, 1926

Inventor:
Hans P. Christensen:
By Chas. C. Tillman
Atty.

Patented Oct. 12, 1926.

1,602,881

UNITED STATES PATENT OFFICE.

HANS P. CHRISTENSEN, OF CHICAGO, ILLINOIS, ASSIGNOR OF ONE-HALF TO WILLIAM KUHE, OF CHICAGO, ILLINOIS.

INSERT ATTACHMENT FOR BREAD-WRAPPING MACHINES.

Application filed April 12, 1926. Serial No. 101,269.

This invention relates to improvements in an attachment for bread wrapping machines, whereby the insertion of a slip of paper, such as a card, or an advertisement, may be quickly, and efficiently effected as the loaves of bread are being fed to be wrapped with paper, and manipulated by the machine, so as to automatically wrap the loaves in neat packages, and seal them.
The invention has as one of its objects, to provide an insert attachment for bread wrapping machines, which shall be simple and inexpensive in its construction, strong, durable and efficient in operation, and so made that it may be attached to a certain part of the machine directly over the platform or table on which the bread is slid along for wrapping, without any material alteration in the construction of the machine.
Another object of the invention is, to provide means for positively holding the inserts or pieces of paper on the loaves of bread, as the latter are carried under my attachment for the purpose of being wrapped.
Other objects and advantages of the invention, will be disclosed in the accompanying drawing, which illustrates an embodiment of which the invention is susceptible, it being understood, that changes, and modifications therein may be resorted to, without a departure from the spirit of the invention, so long as they fall within the scope of the appended claims.

Figure 1:
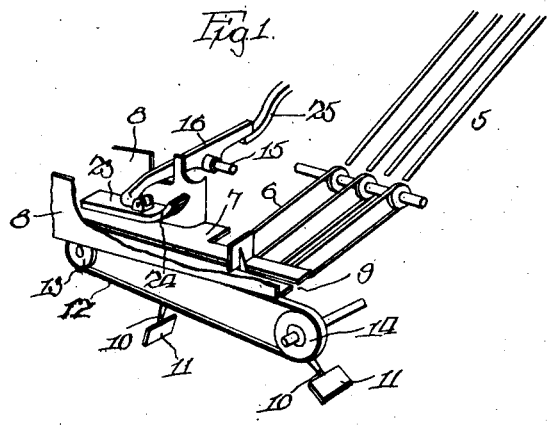
Figure 2:
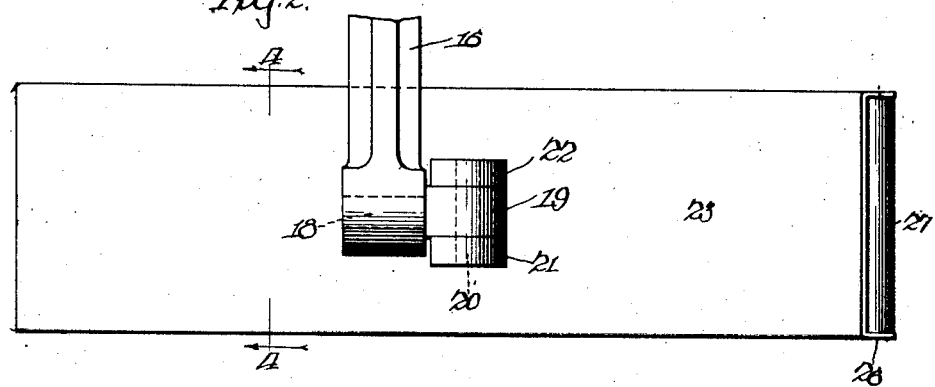
Figure 3:
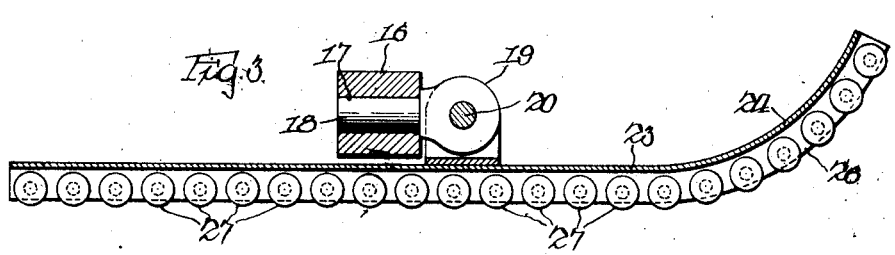
Figure 4:
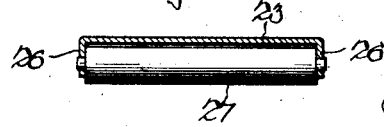

In the drawing:—
Fig. 1 is a perspective view of the bread feed part of a bread wrapping machine, showing my improved insert attachment mounted thereon, and in position for operation.
Fig. 2 is a plan view thereof.
Fig. 3 is a central longitudinal sectional view of the insert holding shoe or member and the bearings therefor, and
Fig. 4 is a cross sectional view taken on
line 4, 4, of Fig. 2.
Like numerals of reference refer to corresponding parts throughout the different views of the drawing.
As is well known, it is often desirable for bakers or the manufacturers of bread, to insert within the wrapper which contains each a loaf of bread, a slip, piece of paper, or a card, with advertising matter thereon, so that it may be read and seen when the bread is un-wrapped, and it is further well known that heretofore, the devices used with bread wrapping machines, for this purpose, have been unsatisfactory in their operation, on account of their inefficient operation, thus causing many of the inserts to be left out of the packages.

This unsatisfactory operation has usually occurred by reason of the shoe which rests on the bread as it is fed to be wrapped, between which shoe, and the loaf of bread, the insert is placed, holding the slip or insert by friction only, and very frequently holding at one of its edges the slip in such a way, that a large percentage of the inserts are dropped from the loaves, which are found by inspection, to be without the inserts, which requires that the loaves be again wrapped, thus causing the loss not only of the inserts, but also of the paper and time used for wrapping the bread. By my improvements the inserts are held on the loaves by a rolling contact instead of a frictional one, and I have found by practical use that by my improvements the loss of the inserts and the necessity of requiring the re-wrapping of the bread is reduced to a minimum, if not to say eliminated.

Referring now, to the drawing, the reference numeral 5, designates as a whole, a part of a chute of a bread wrapping machine, the lower end of which terminates near one end of a conveyer designated as a whole by the numeral 6, which may be operated in the usual or well known manner, which forms no part of my invention. This conveyer 6, is so located as to place the loaves of bread as they descend from the chute 5, onto a platform 7, which has at each of its sides a guiding wall 8, and is provided in its longitudinal middle with a slot 9, through which the arms 10, each carrying a paddle or pusher 11, passes. These arms are mounted in spaced relation, and extend outwardly from a continuous belt 12, which passes over pulleys 13, and 14, by means of one of which the belt 12, may be driven. The platform or table 7, may be part of the bread wrapping table or platform, or may extend at one of its ends into close proximity thereto, as well as to the cutter (not shown) which severs the wrapping paper for the loaves.

Journaled on a shaft 15, located above and to one side of the platform 7, is a rocking member or lever 16, which extends at one of its ends over the platform 7, at a distance therefrom. This lever 16, has at its end adjacent to the platform 7, a transverse bearing 17, in which is journaled the stub shaft 18, of a bearing member 19, which member is journaled on a shaft 20, horizontally located between the spaced ears 21, and 22, with which the upper surface of the holding shoe 23, is provided at about its middle. Thus it will be seen that the holding shoe 23, will be afforded a substantially universal bearing on one end of the lever 16, the other end of which may rest upon one end of the lever 25, employed for actuating the cutter (not shown) for the wrapping paper.

The holding shoe 23, as is clearly shown in Figs. 2, to 4, inclusive comprises an elongated rectangular plate having its feeding end curved upwardly as at 24, see Figs. 1, and 3, of the drawing. This plate is provided at its side edges with down turned flanges 26, between which are journaled a plurality of parallel rollers 27, which will rest on the top of the loaf of bread as it is carried along the platform 7, by one of the paddles or pushers 11, which as before stated are spaced apart on the belt 12, or conveyer therefor.

Now, the holding shoe 23, is located directly above the slot 9, in the platform 7, so that the loaves of bread may pass there under in contact with the rollers 27, in which operation, it is manifest that as the feeding end of the holding shoe 23, is upturned, it provides ready access for the insertion of one end or edge of an insert, when by reason of the action of the rollers turning in their bearings, and by reason of the fact that the loaves are carried on the platform and below the shoe 23, by means of the paddles 11, that the inserts will be firmly and accurately held in position on the loaves by the rollers thereof, and thus prevent liability of them falling from the loaves before being wrapped.

Having thus fully described my invention, what I claim as new and desire to secure by Letters Patent is:—

1. An insert attachment for bread wrapping machines, comprising a holding shoe pivotally mounted on one end of a lever and located at a distance above the bread feeding platform of the machine, said lever fulcrumed at one side and above said platform, and rollers transversely journaled on the holding shoe below its lower surface.

2. An insert attachment for bread wrapping machines, comprising a holding shoe mounted for substantially universal movement at a distance above the bread feeding platform of the machine, said shoe having at each of its longitudinal edges a depending flange and rollers transversely journaled on and between said flanges.

HANS P. CHRISTENSEN.